(12) United States Patent
Wang et al.

(10) Patent No.: US 11,275,961 B2
(45) Date of Patent: Mar. 15, 2022

(54) CHARACTER IMAGE PROCESSING METHOD AND APPARATUS, DEVICE, AND STORAGE MEDIUM

(71) Applicant: BEIJING SENSETIME TECHNOLOGY DEVELOPMENT CO., LTD., Beijing (CN)

(72) Inventors: Quan Wang, Beijing (CN); Ding Liang, Beijing (CN); Chen Qian, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 79 days.

(21) Appl. No.: 16/693,616

(22) Filed: Nov. 25, 2019

(65) Prior Publication Data

US 2020/0089985 A1 Mar. 19, 2020

Related U.S. Application Data

(63) Continuation of application No. PCT/CN2018/112093, filed on Oct. 26, 2018.

(30) Foreign Application Priority Data

Dec. 22, 2017 (CN) .......................... 201711407535.0

(51) Int. Cl.
*G06K 9/00* (2006.01)
*G06K 9/32* (2006.01)
(Continued)

(52) U.S. Cl.
CPC ....... *G06K 9/3208* (2013.01); *G06K 9/00456* (2013.01); *G06K 9/325* (2013.01);
(Continued)

(58) Field of Classification Search
CPC .. G06K 9/3208; G06K 9/00456; G06K 9/325; G06K 9/342; G06K 2209/01; G06N 3/08
See application file for complete search history.

(56) References Cited

U.S. PATENT DOCUMENTS

2018/0158188 A1\* 6/2018 Chu .......................... G06T 7/11
2018/0342061 A1 11/2018 Xiang et al.

FOREIGN PATENT DOCUMENTS

CN 104899571 A 9/2015
CN 104966097 A 10/2015
(Continued)

OTHER PUBLICATIONS

Guo Xue, Wang You-wang; Recognition of Similar Handwritten Chinese Characters Based on CNN and Random Elastic Deformation; mailed on Jan. 31, 2014; pp. 72-76.
(Continued)

*Primary Examiner* — Ping Y Hsieh
*Assistant Examiner* — Xiao Liu
(74) *Attorney, Agent, or Firm* — Pattao, LLC; Junjie Feng

(57) ABSTRACT

Provided are character image processing methods and apparatuses, devices, storage medium, and computer programs. The character image processing method mainly comprises: obtaining at least one image block containing a character in a character image to be processed; obtaining image block form transformation information of the image block on the basis of a neural network, the image block form transformation information being used for changing a character orientation in the image block to a predetermined orientation, and the neural network being obtained by means of training using an image block sample having form transformation label information; performing form transformation processing on the character image to be processed according to the image block form transformation information; and
(Continued)

S100: at least one image block containing a character in a character image is obtained S110: image block form transformation information of each of the at least one image block is obtained on the basis of a neural network S120: form transformation processing is performed on the character image to be processed according to the image block form transformation information S130: character recognition is performed on the character image which is subjected to the form transformation performing character recognition on the character image to be processed which is subjected to the form transformation.

18 Claims, 8 Drawing Sheets

(51) Int. Cl.
    *G06K 9/34*     (2006.01)
    *G06N 3/08*     (2006.01)

(52) U.S. Cl.
    CPC ............... *G06K 9/342* (2013.01); *G06N 3/08* (2013.01); *G06K 2209/01* (2013.01)

(56) References Cited

FOREIGN PATENT DOCUMENTS

| | | | | |
|---|---|---|---|---|
| CN | 105809164 | A | | 7/2016 |
| CN | 106127204 | A | | 11/2016 |
| CN | 106203418 | A | | 12/2016 |
| CN | 106295629 | A | | 1/2017 |
| CN | 106408038 | A | * | 2/2017 |
| CN | 106408038 | A | | 2/2017 |
| CN | 106778659 | A | | 5/2017 |
| CN | 108229470 | A | | 6/2018 |
| JP | 2002133407 | A | | 5/2002 |
| JP | 2003168076 | A | | 6/2003 |
| JP | 2006260274 | A | * | 9/2006 ........... G06K 9/3283 |
| JP | 2008537861 | A | | 9/2008 |

OTHER PUBLICATIONS

International Search Report in the international application No. PCT/CN2018/112093, dated Jan. 30, 2019.
First Office Action of the Chinese application No. 201711407535.0, dated Nov. 25, 2019.
First Office Action of the Japanese application No. 2020-511273, dated Mar. 30, 2021.
Mikota Rotation normalization of the figure according [ the outside of Satoshi ] to four persons and a neural network, The Journal of The Institute of Image Information and Television Engineers The 52nd vol. No. 11, Institute of Image Information and Television Engineers, Nov. 20, 1998, the 52nd vol. No. 11, pp. 1713-1723.

* cited by examiner

CHARACTER IMAGE PROCESSING METHOD AND APPARATUS, DEVICE, AND STORAGE MEDIUM

CROSS-REFERENCE TO RELATED APPLICATIONS

The present disclosure is a U.S. continuation application of International Application No. PCT/CN2018/112093, filed on Oct. 26, 2018, which claims benefit of Chinese Patent Application No. 201711407535.0, filed to the Chinese Patent Office on Dec. 22, 2017 and entitled "CHARACTER IMAGE PROCESSING METHOD AND APPARATUS, DEVICE, AND STORAGE MEDIUM". The disclosures of these applications are incorporated herein by reference in their entirety.

BACKGROUND

Character images are images containing characters (such as Chinese characters, or English words, or characters in other languages, or numbers). In some circumstances, the character recognition rate in images may not reach expected accuracy. How to improve the accuracy of character recognition is a technical problem worthy of attention.

SUMMARY

The present disclosure relates to computer vision technologies, and in particular, to character image processing methods, neural network training methods, character image processing apparatuses, neural network training apparatuses, electronic devices, computer readable storage medium, and computer programs.

Implementation modes of the present disclosure provide technical solutions of character image processing.

According to one aspect of the implementation modes of the present disclosure, provided is a character image processing method, including: obtaining at least one image block containing a character in a character image; obtaining image block form transformation information of each of the at least one image block on the basis of a neural network, the image block form transformation information being used for changing a character orientation in an image block to a predetermined orientation, and performing form transformation processing on the character image according to the image block form transformation information; and performing character recognition on the character image which is subjected to form transformation.

According to another aspect of the implementation modes of the present disclosure, provided is a character image processing apparatus, including: an image block obtaining module, configured to obtain at least one image block containing a character in a character image; a transformation information obtaining module, configured to obtain image block form transformation information of each of the at least one image block on the basis of a neural network, the image block form transformation information being used for changing a character orientation in an image block to a predetermined orientation; a transformation processing module, configured to perform form transformation processing on the character image according to the image block form transformation information; and a character recognition module, configured to perform character recognition on the character image which is subjected to form transformation.

According to another aspect of the implementation modes of the present disclosure, provided is an electronic device, including: a memory, configured to store a computer program; and a processor, configured to execute the computer program stored in the memory, and when the computer program is executed, implement the operations in the implementation mode of any one of the character image processing methods of the present disclosure.

According to another aspect of the implementation modes of the present disclosure, provided is a computer readable storage medium, which stores a computer program thereon, where when the computer program is executed by a processor, the processor implements the operations in the implementation mode of any one of the character image processing methods of the present disclosure.

According to another aspect of the implementation modes of the present disclosure, provided is a computer program, which includes computer instructions, where when the computer instructions run on a processor in a device, the processor implements the operations in the implementation mode of any one of the character image processing methods of the present disclosure.

BRIEF DESCRIPTION OF DRAWINGS

The drawings constituting a part of the specification describe implementation modes of the present disclosure, and are used for explaining the principles of the present disclosure in combination of the description.

According to the following detailed descriptions, the present disclosure can be understood more clearly with reference to the accompanying drawings.

DETAILED DESCRIPTION

Figure 1:
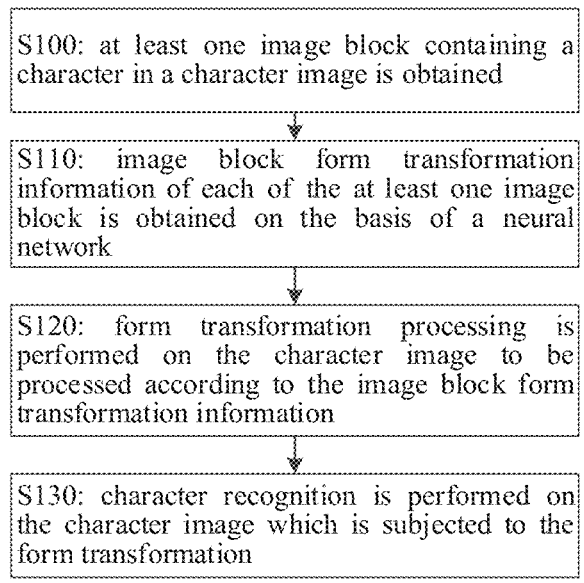
FIG. 1 is a flowchart of a character image processing method provided by embodiments of the present disclosure.

Various exemplary embodiments of the present disclosure are now described in detail with reference to the accompanying drawings. It should be noted that, unless otherwise stated specifically, relative arrangement of the components and operations, the numerical expressions, and the values set forth in the implementation modes are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

Based on the character image processing methods, character image processing apparatuses, devices, storage medium, and computer programs provided by the present application present disclosure, by using a neural network to obtain image block form transformation information used for changing a character orientation in an image block to a predetermined orientation, the present disclosure can conveniently and quickly implements form transformation processing on a character image to be processed according to the image block form transformation information outputted by the neural network, thereby enabling the character orientation of the character image to be processed which is subjected to the form transformation processing to be the predetermined orientation (for example, a horizontal orientation). Hence, the present disclosure can effectively avoid the phenomenon that the accuracy of character recognition for a character image may be affected due to inclination of a character orientation, and finally, the technical solutions of character image processing provided by the present disclosure can improve the accuracy of character recognition.

The embodiments of the present disclosure may be applied to electronic devices such as terminal devices, computer systems, servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the systems, and the like.

The electronic devices such as terminal devices, computer systems, and servers may be described in the general context of computer system executable instructions (for example, program modules) executed by the computer system. Generally, the program modules may include routines, programs, target programs, components, logics, and data structures, to execute specific tasks or implement specific abstract data types. The computer system/server may be practiced in the distributed cloud computing environments in which tasks are performed by remote processing devices that are linked through a communications network. In the distributed computing environments, the program modules may be located in local or remote computing system storage medium including storage devices.

FIG. 1 is an exemplary flowchart of a character image processing method provided by embodiments of the present disclosure. As shown in FIG. 1, the method includes: operation S100, operation S110, operation S120, and operation S130. Each operation in FIG. 1 is illuminated in detail as follows.

S100. at least one image block containing a character in a character image to be processed is obtained.

In some implementation modes, the character image to be processed in the present disclosure may be an RGB (red, green, blue)-based image or a YUV (luminance and chrominance)-based image. The character image to be processed in the present disclosure may be an image such as a picture or photo in a static state, and may also be a video frame in a video in a dynamic state. The character image to be processed may include one or more character paragraphs made of a plurality of characters, or may also include characters which are not presented in the form of paragraphs, for example, characters presented in the form of tables. The characters in the present disclosure may include characters expressing a specific meaning (such as Chinese characters, or English words, or characters in other languages), numbers, and the like. A specific expressive form of the characters in the character image to be processed is not limited in the present disclosure.

In some implementation modes, the characters in the character image to be processed include, but are not limited to, at least one of:

various types of characters or numbers, such as Chinese characters, English words, and Latin letters; and various types of separators, punctuation marks, or mathematical operators, such as commas, ellipses, brackets, and plus signs.

In S100, at least one image block containing a character is obtained, where the image block is rectangular, or square, or other shapes. In addition, if the at least one image block is a plurality of image blocks, the sizes of different image blocks in the plurality of image blocks may be the same or different, for example, all the image blocks have the same size, where the size may be a preset size, or a size based on at least a part of the character image to be processed. For another example, the size of an image block located at the edge in the plurality of image blocks is different from that of an image block located in the middle (i.e., an image block not located at the edge). In some implementation modes, the image block is a square image block having a predetermined size, and the shape and size of the image block is related with a requirement of a neural network on the image block. Shapes, sizes, and the like of image blocks are not limited in the present disclosure.

Optionally, the image block contains the entire character image to be processed, or a part of the character image to be processed. In some implementation modes, character detection is performed on the character image to be processed, so as to obtain a character area in the character image to be processed, and the character area in the character image to be processed is divided into at least one image block, where the character area in the character image to be processed may be determined in multiple modes, for example, but not limited to, inputting the character image to be processed to a character detection neural network for processing, so as to obtain information of the character area in the character image to be processed. At this time, the at least one image block obtained by dividing the character area is called as at least one image block containing a character.

In some other implementation modes, the character image to be processed is divided into a plurality of image blocks, and character detection processing is performed on each image block of the plurality of image blocks, so as to obtain at least one image block containing characters. However, this is not limited in the embodiments of the present disclosure.

In some other implementation modes, cutting processing is performed on the character image to be processed to obtain an image block containing a character in the character image to be processed. The number of the at least one image block obtained by the cutting processing is one or more, and a rule of the cutting processing may be set in advance, for example, the largest area, or the smallest length-width ratio, or the longest long side or short side. This is not limited in the embodiments of the present disclosure.

In one example, the at least one image block means one image block. In this situation, optionally, a square image block is cut from the character image to be processed by taking the central position of the character image to be processed as the center, and the short side of the character image to be processed as the side length, where the square image block is a image block, having the largest area, that may be cut from the character image to be processed.

Optionally, in the cutting process above, a square image block may also be cut from the character image to be processed by taking the central position of the character image to be processed as the center, and a length shorter than the short side of the character image to be processed as the side length, or a rectangular image block is cut from the character image to be processed by taking a length longer than the short side and shorter than the long side of the character image to be processed as the long side, and the short side of the character image to be processed as the short side.

In another example, the at least one image block means two image blocks. In this situation, optionally, two square image blocks are cut from the character image to be processed by taking the two short sides of the character image to be processed as the side length of the square, where the two square image blocks both are image blocks, having the largest area, that may be cut from the character image to be processed.

It should be understood that the foregoing descriptions are merely exemplary. The specific cutting modes, such as the number of image blocks cut from the character image to be processed and cutting positions, are not limited in the present disclosure.

In some implementation modes, the image block in the present disclosure contains the entire character image to be processed. The image block may be the character image to be processed per se, or obtained by performing one or more processing on the character image to be processed. For example, filling processing is performed on the character image to be processed to obtain at least one square image block containing the entire character image to be processed.

In one example, in a case where the character image to be processed is rectangular, the character image to be processed may be filled with blank content in a short side orientation, so as to form an image block taking the long side of the character image to be processed as the side length of the square. Or, in the filling process above, the character image to be processed may be filled with blank content separately in the short side orientation and a long side orientation, so that the side length of the formed square image block is slightly longer than the long side of the character image to be processed.

S110. image block form transformation information of each of the at least one image block is obtained on the basis of a neural network.

In some implementation modes, the image block is directly provided for the neural network, for example, a form transformation neural network, and the image block form transformation information is obtained according to information outputted by the neural network with regard to an inputted image block.

In some other implementation modes, the image block is subjected to one or more processing and then provided for the neural network. For example, if in operation S100 above, the size, shape or the like of the image block generated based on the character image to be processed does not satisfy a requirement of the neural network on an inputted image block, then in the operation S110, the size, shape or the like of the image block is adjusted first to make an adjusted image block to satisfy the requirement of the neural network on the inputted image block, and then the adjusted image block is provided for the neural network.

The image block form transformation information being used for changing a character orientation in the image block to a predetermined orientation. In some implementation modes, the image block form transformation information outputted by the neural network with regard to the inputted image block includes: at least one of perspective transformation information of the image block and image block rotation information indicating an integer multiple of 90 degrees. The perspective transformation information of the image block is used for enabling the image block to carry out rotation based on perspective transformation, where optionally, the angle of rotation based on perspective transformation is less than 90 degrees. The perspective transformation information of the image block includes, but is not limited to, perspective coordinate transformation information of vertices of the image block, for example, coordinate perspective transformation information of four vertices of the image block. The image block rotation information indicating an integer multiple of 90 degrees is used for performing rotation processing on the image block by an integer multiple of 90 degrees, and includes, but is not limited to, indication information used for indicating an angle of rotation in the rotation processing by an integer multiple of 90 degrees, for example, 0, 1, 2, or 3, where 0 indicates not rotating, 1 indicates rotating by 90 degrees clockwise/counterclockwise, 2 indicates rotating by 180 degrees clockwise/counterclockwise, and 3 indicates rotating by 270 degrees clockwise/counterclockwise. This is not limited in the embodiments of the present disclosure.

In some application scenarios, due to problems such as a photographing angle of the image, text which is originally of a standard size appears to have a phenomenon that one end is larger than the other, and this phenomenon may cause the problem of a low recognition rate. In the embodiments of the present disclosure, a perspective coordinate change is performed on the image block to correct the problem in the character image that one end is larger than the other, which is caused by the photographing angle, so that the recognition accuracy for the character image is improved.

In some other situations, there may be a change in the orientation of characters, for example, the character image to be processed or the image block is subjected to rotation processing before being inputted to the neural network. In the embodiments of the present disclosure, by performing rotation processing or reversed rotation processing on the image block, the characters are enabled to be oriented in the predetermined orientation, for example, the line orientation of the characters is rotated to the horizontal orientation. For example, in addition to integer multiples of 90 degrees, the angle of rotation may further be 60 degrees, 30 degrees, or any degrees.

In some implementation modes, in the case that the image block form transformation information outputted by the neural network with regard to the image block includes the perspective transformation information of the image block and the image block rotation information indicating an integer multiple of 90 degrees, optionally, the neural network includes: a shared neural network configured to extract an image feature of the image block, a first branch configured to output perspective transformation information of the image block, and a second branch configured to output image block rotation information indicating an integer multiple of 90 degrees, where the image feature extracted by the shared neural network from the image block is separately provided for the first branch and the second branch.

In some implementation modes, the image block form transformation information is further used for determining whether to perform form transformation processing on the character image to be processed or the at least one image block. In some examples, the image block form transformation information further includes indication information used for determining whether to perform the form transformation processing on the character image to be processed, where optionally, the indication information indicates whether the number of characters in the image block satisfies a predetermined requirement, or indicates whether the area occupied by the character in the image block satisfies a predetermined requirement, or the like. Optionally, the predetermined requirement includes: the area, or number, or proportion of the occupied area of the characters in the image block reaches a predetermined ratio, where the predetermined ratio may be about 0.3, or other values, and the specific value depends on an actual application scenario. This is not limited in the embodiments of the present disclosure. For example, with regard to the inputted image block, the neural network further outputs the indication information indicating whether the number of the characters in the image block, or the area occupied by the character satisfies the predetermined requirement. For example, the neural network outputs an indicator indicating whether the proportion, in the image block, of the area occupied by the character in the image block, or the number of the characters satisfies the predetermined requirement, where the indicator includes, for example, but is not limited to, 0 and 1, 0 indicates that the predetermined requirement is not satisfied, 1 indicates that the predetermined requirement is satisfied, and the like. For another example, the neural network outputs, with regard to the inputted image block, the occupied area or number of the characters in the image block, or outputs the ratio of the area occupied by the character in the image block to the area of the image block. For another example, the neural network outputs, with regard to the inputted image block, a probability value that the ratio of the area occupied by the character in the image block to the area of the image block reaches a predetermined ratio, and correspondingly, in a case where the probability value is lower than a predetermined probability value, the ratio of the area occupied by the character in the image block to the area of the image block is considered as not reaching the predetermined ratio; and in a case where the probability value is not lower than the predetermined probability value, the ratio of the area occupied by the character in the image block to the area of the image block is considered as reaching the predetermined ratio. Or, the indication information may also be implemented in other modes. This is not limited in the embodiments of the present disclosure.

In some implementation modes, in a case where the at least one image block containing a character is a plurality of image blocks, in each image block, whether the area occupied by the character in the image block satisfies the preset requirement is determined, and the proportion of the image blocks with the areas occupied by the characters satisfying the preset requirement in the plurality of image blocks is further determined. If the proportion is greater than the preset proportion, indication information indicating that the area occupied by the character in the image block satisfies the predetermined requirement is generated, and rotation processing is performed on the plurality of image blocks. In some other implementation modes, if the proportion is not greater than the preset proportion, indication information indicating that the areas occupied by the character in the image blocks do not satisfy the predetermined requirement is generated.

Because the areas occupied by different types of text may be different, for example, the area occupied by a punctuation mark is generally smaller than the area occupied by a character, accurate determination may be not achieved if the determined is merely based on whether the area occupied by the character in a single image block satisfies the predetermined requirement; by collecting statistics about situations, where whether the areas occupied by the characters in respective image blocks satisfy the predetermined requirement, of all the image blocks corresponding to the character image to be processed, and then determining whether to performing the form transformation processing on the image block, the accuracy may be further improved.

In some other implementation modes, whether the area occupied by the character in the corresponding image block satisfies the predetermined requirement includes that: the area occupied by the character in the corresponding image block reaches a preset area threshold, or the like. This is not limited in the embodiments of the present disclosure.

Figure 2:
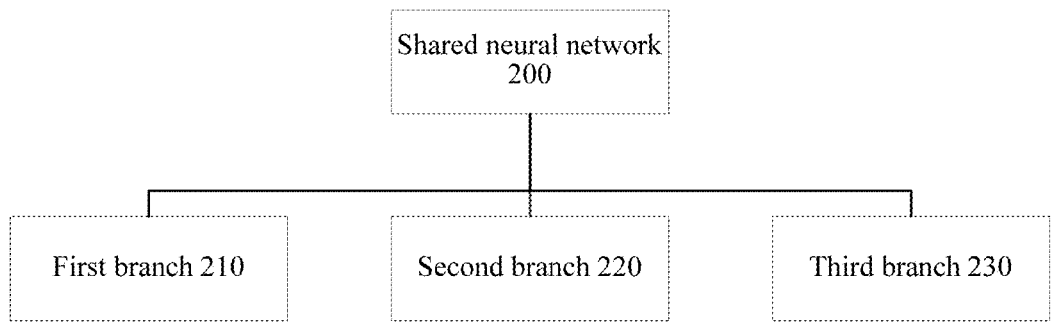
FIG. 2 is a schematic diagram of some implementation modes of a neural network provided by embodiments of present disclosure.

In some implementation modes, in a case where the neural network outputs, with regard to the inputted image block, the perspective transformation information of the image block, the image block rotation information indicating an integer multiple of 90 degrees, and the indication information indicating whether the ratio of the area occupied by the character in the image block to the area of the image block reaches the predetermined ratio, one example of the neural network is as illustrated in FIG. 2. The neural network in FIG. 2 includes: a shared neural network 200 configured to extract an image feature of an inputted image block, a first branch 210 configured to output the perspective transformation information of the image block, a second branch 220 configured to output the image block rotation information indicating an integer multiple of 90 degrees, and a third branch 230 configured to output the indication information indicating whether the ratio of the area occupied by the character in the image block to the area of the image block reaches the predetermined ratio, where the image feature extracted by the shared neural network 200 from the image block is separately provided for the first branch 210, the second branch 220, and the third branch 230.

The neural network in the embodiments of the present disclosure may be implemented in a plurality of modes. In some implementation modes, the neural network may be a convolutional neural network. The specific network structure of the convolutional neural network is not limited in the present disclosure. For example, the convolutional neural network includes, but is not limited to: a convolutional layer, a non-linear Relu layer, a pooling layer, a fully connected layer, and the like. The more layers the convolutional neural network includes, the deeper the network is. For another example, a network structure of the convolutional neural network may adopt, but is not limited to, ALexNet, Deep Residual Network (ResNet), Visual Geometry Group Network (VGGnet), and other network structure used by a neural network.

Figure 3:
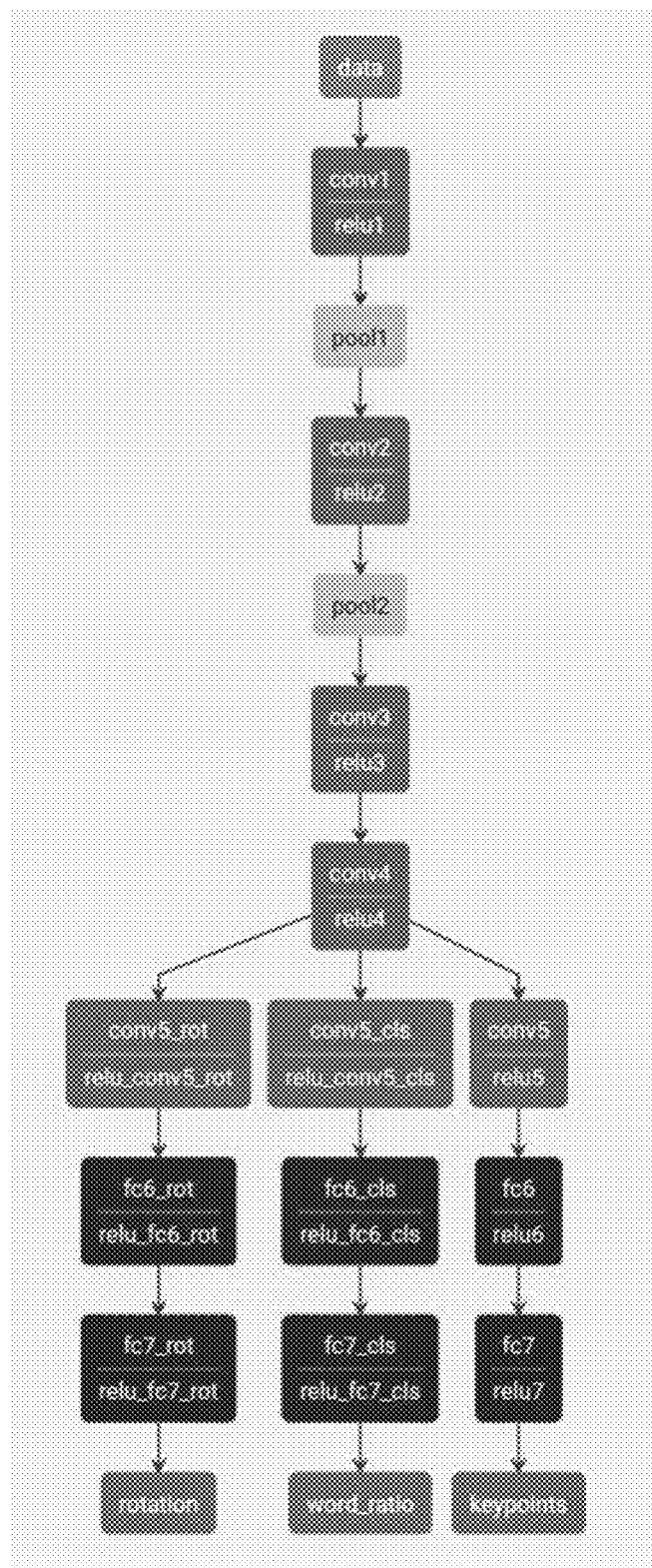
FIG. 3 is a schematic diagram of some other implementation modes of a neural network provided by embodiments of present disclosure.

One example of the convolutional neural network is as illustrated in FIG. 3. The neural network in FIG. 3 includes: a first convolutional layer (i.e., conv1 in FIG. 3), a Relu layer of the first convolutional layer (i.e., relu1 in FIG. 3), a first pooling layer (i.e., pool1 in FIG. 3), a second convolutional layer (i.e., conv2 in FIG. 3), a Relu layer of the second convolutional layer (i.e., relu2 in FIG. 3), a second pooling layer (i.e., pool2 in FIG. 3), a third convolutional layer (i.e., conv3 in FIG. 3), a Relu layer of the third convolutional layer (i.e., relu3 in FIG. 3), a fourth convolutional layer (i.e., conv4 in FIG. 3), and a Relu layer of the fourth convolutional layer (i.e., relu4 in FIG. 3), which belong to a shared neural network; a fifth convolutional layer (i.e., conv5 in FIG. 3), a Relu layer of the fifth convolutional layer (i.e., relu5 in FIG. 3), a sixth fully connected layer (i.e., fc6 in FIG. 3), a Relu layer of the sixth fully connected layer (i.e., relu6 in FIG. 3), a seventh fully connected layer (i.e., fc7 in FIG. 3), and a Relu layer of the seventh fully connected layer (i.e., relu7 in FIG. 3), which belong to a first branch; a fifth convolutional layer (i.e., conv5_rot in FIG. 3), a Relu layer of the fifth convolutional layer (i.e., relu_conv5_rot in FIG. 3), a sixth fully connected layer (i.e., fc6_rot in FIG. 3), a Relu layer of the sixth fully connected layer (i.e., relu_fc6_rot in FIG. 3), a seventh fully connected layer (i.e., fc7_rot in FIG. 3), and a Relu layer of the seventh fully connected layer (i.e., relu_fc7_rot in FIG. 3), which belong to a second branch; and a fifth convolutional layer (i.e., conv5_cls in FIG. 3), a Relu layer of the fifth convolutional layer (i.e., relu_conv5_cls in FIG. 3), a sixth fully connected layer (i.e., fc6_cls in FIG. 3), a Relu layer of the sixth fully connected layer (i.e., relufc6_cls in FIG. 3), a seventh fully connected layer (i.e., fc7_cls in FIG. 3), and a Relu layer of the seventh fully connected layer (i.e., relu_fc7_cls in FIG. 3), which belong to a third branch.

The neural network in the embodiments of the present disclosure is a neural network successfully obtained by means of training using a training data set including a plurality of pieces of training data. The training data included in the training data set includes image block samples and form transformation label information of the image block samples. In some implementation modes, the training data may further include label information indicating whether the area occupied by a character in an image block sample satisfies a predetermined requirement. For example, the training data includes perspective transformation label information of an image block sample, image block sample rotation label information indicating an integer multiple of 90 degrees, and label information indicating whether the ratio of the area occupied by a character in the image block sample to the area of the image block sample reaches a predetermined ratio. The process of training the neural network using the training data set, please refer to the following description for FIG. 4. Descriptions are not made herein in detail.

S120. form transformation processing is performed on the character image to be processed according to the image block form transformation information.

In some implementation modes, the image block form transformation information includes perspective transformation information of the image block and image block rotation information indicating an integer multiple of 90 degrees, and in a case where the at least one image block containing a character generated based on the character image to be processed means one image block, one implementation mode for performing form transformation processing on the character image to be processed according to the image block form transformation information includes:

first, performing, according to the image block rotation information indicating an integer multiple of 90 degrees, rotation processing (for example, reversed rotation processing) on the character image to be processed by an integer multiple of 90 degrees, so as to obtain a rotated character image to be processed;

then determining a perspective transformation matrix according to the perspective transformation information of the image block, where as an example, the perspective transformation information of the image block may include displacement amounts of coordinates of vertices, the perspective transformation matrix is obtained according to the displacement amounts, and the perspective transformation matrix may enable positions of points in the image to change; and finally, using the perspective transformation matrix to perform perspective transformation on a rotated character image to be processed, so as to obtain a character image subjected to the form transformation processing. For example, the character image subjected to perspective transformation is a character image obtained after the character image to be processed is subjected to corresponding form transformation processing.

In some implementation modes, the image block form transformation information includes perspective transformation information of the image block and image block rotation information indicating an integer multiple of 90 degrees, and in a case where the at least one image block containing a character generated based on the character image to be processed is a plurality of image blocks, one implementation mode for performing form transformation processing on the character image to be processed according to the image block form transformation information includes that:

first, the image block form transformation information includes image block rotation information indicating an integer multiple of 90 degrees corresponding to some or each image block in the plurality of image blocks. The image block rotation information includes a probability value, where the probability value is outputted by the neural network, or is obtained by other modes, which is not limited in the embodiments of the present disclosure, optionally, the probability value indicates a probability that the image block is subjected to rotation processing by a corresponding angle, or indicates a confidence value that the image block is subjected to rotation processing by a corresponding angle, or the like, and image block rotation information indicating an integer multiple of 90 degrees with the highest probability value is determined form the image block rotation information of the plurality of image blocks, for example, if the probability value of a first image block indicating rotating by 180 degrees clockwise/counterclockwise is 0.6, and the probability value of a second image block indicating rotating by 90 degrees clockwise/counterclockwise is 0.65, the image block rotation information indicating an integer multiple of 90 degrees of the second image block is selected;

then, the character image to be processed is subjected to rotation processing by an integer multiple of 90 degrees (for example, performing forward or reversed rotation processing by a corresponding angle) according to the determined image block rotation information indicating an integer multiple of 90 degrees with the highest probability value;

then, the image block form transformation information further includes perspective transformation information of some or each of the plurality of image blocks, perspective transformation matrices are calculated respectively with regard to the perspective transformation information of each image block, and a perspective transformation average matrix is calculated on the basis of the perspective transformation matrices corresponding to the plurality of image blocks, where the perspective transformation average matrix is configured to enable the image blocks to rotate based on perspective transformation, and the angle of rotation based on perspective transformation is generally less than 90 degrees; and finally, the rotated character image to be processed is subjected to perspective transformation by using the calculated perspective transformation average matrix so as to obtain a character image obtained after the character image to be processed is subjected to corresponding form transformation processing.

In some other implementation modes, the image block form transformation information includes: perspective transformation information of the image block, image block rotation information indicating an integer multiple of 90 degrees, and indication information indicating whether the area occupied by the character in the image block satisfies a predetermined requirement, and in a case where the at least one image block containing a character generated based on the character image to be processed means one image block, one implementation mode for performing form transformation processing on the character image to be processed according to the image block form transformation information includes:

first, determining, on the basis of the indication information indicating whether the area occupied by the character in the image block satisfies the predetermined requirement, whether the area occupied by the character in the image block satisfies the predetermined requirement, where in some implementation modes, the indication information is outputted by the neural network, or is obtained by other modes, which is not limited in the embodiments of the present disclosure, for example, assuming that the indication information indicates whether the ratio of the area occupied by the character in the image block to the area of the image block reaches a predetermined ratio, whether the indication information indicates that the ratio of the area occupied by the character in the image block to the area of the image block exceeds the predetermined ratio is determined, and if the determination result is that the area occupied by the character in the image block satisfies the predetermined requirement, the character image is subjected to rotation processing by an integer multiple of 90 degrees according to the image block rotation information indicating an integer multiple of 90 degrees; and then determining a perspective transformation matrix according to the perspective transformation information of the image block and performing perspective transformation on a rotated character image to be processed by using the perspective transformation matrix. Optionally, if the determination result is that the area occupied by the character in the image block does not satisfy the predetermined requirement, the operation of performing form transformation processing on the character image to be processed according to the perspective transformation information of the image block and the image block rotation information indicating an integer multiple of 90 degrees is not executed.

In some other implementation modes, the image block form transformation information includes: perspective transformation information of the image block, image block rotation information indicating an integer multiple of 90 degrees, and indication information indicating whether the area occupied by the character in the image block satisfies a predetermined requirement, and in a case where the at least one image block containing a character generated based on the character image to be processed is a plurality of image blocks, the image block form transformation information includes indication information corresponding to all the image blocks or some image blocks in the plurality of image blocks. Assuming that the image block form transformation information includes indication information corresponding to each image block in the plurality of image blocks, one implementation mode for performing form transformation processing on the character image to be processed according to the image block form transformation information includes:

first, determining whether the following exists in all pieces of indication information indicating whether the area occupied by the character in the image block satisfies a predetermined requirement, i.e., the indication information corresponding to the plurality of image blocks: indication information indicating that the area occupied by the character in the image block satisfies the predetermined requirement, i.e., determining whether first indication information indicating the area occupied by the character in the corresponding image block satisfies the predetermined requirement exists, for example, if indication information indicates whether a ratio of the area occupied by the character in the image block to the area of the image block reaches a predetermined ratio, and the predetermined ratio equals to 0.3, determining whether the following exists in all pieces of indication information outputted by the neural network: indication information indicating that the ratio of the area occupied by the character in the image block to the area of the image block exceeds 0.3;

optionally, if the determination result is that the indication information indicating that the area occupied by the character in the image block satisfies the predetermined requirement (i.e., the first indication information) exists, determining, from probability values corresponding to image block rotation information indicating an integer multiple of 90 degrees outputted by the neural network with regard to each image block, the image block rotation information indicating an integer multiple of 90 degrees with the highest probability value, for example, if the probability value of a first image block indicating rotating by 180 degrees clockwise/counterclockwise is 0.6, and the probability value of a second image block indicating rotating by 90 degrees clockwise/counterclockwise is 0.65, determining that the probability value of the image block rotation information indicating an integer multiple of 90 degrees of the second image block is the highest; in addition, calculating a perspective transformation matrix on the basis of perspective transformation information of the image block outputted by the neural network with regard to each image block, and calculating a perspective transformation average matrix on the basis of all the perspective transformation matrices; performing rotation processing by an integer multiple of 90 degrees on the character image to be processed according to the image block rotation information indicating an integer multiple of 90 degrees with the highest probability value, where optionally, in a case where the probability value indicates that rotation processing by the corresponding angle is carried out before, reversed rotation processing by a corresponding angle may be performed on the character image to be processed, however, this is not limited in the embodiments of the present disclosure; and performing perspective transformation on a rotated character image to be processed by using the calculated perspective transformation average matrix so as to obtain a character image obtained after the character image to be processed is subjected to corresponding form transformation processing.

Optionally, if the determination result is that the first indication information indicating the area occupied by the character in the image block satisfies the predetermined requirement does not exist, the operation of performing form transformation processing on the character image to be processed according to the perspective transformation information of the image block and the image block rotation information indicating an integer multiple of 90 degrees is not executed.

S130. character recognition is performed on the character image to be processed which is subjected to form transformation.

In some implementation modes, Optical Character Recognition (OCR) and other technologies may be used to carry out character recognition processing on the character image to be processed which is subjected to form transformation. The specific implementation modes of character recognition are not limited in the embodiments of the present disclosure.

Optionally, the character recognition in S130 may include determining character content in the character image to be processed, or include performing character detection on the character image to be processed, and determining character content in the character image to be processed on the basis of the character detection result. This is not limited in the embodiments of the present disclosure.

In the embodiments of the present disclosure, by adjusting a character orientation in the image block to a predetermined orientation, an inverted or inclined character may be properly placed. For a character in a fax, an image photographed by a handheld device, or a photocopy image, the phenomenon of inclination or inversion may appear. If recognition is directly performed on an inclined or inverted character, the problem of low recognition rate may be caused. In the embodiments of the present disclosure, by correcting the character orientation in the image block, the text is oriented to a specified preset orientation, so that the problem of low recognition rate caused by orientation of the characters is reduced, and the recognition rate for characters in an image is improved.

According to the present disclosure, by using a neural network to obtain image block form transformation information used for changing a character orientation in an image block to a predetermined orientation, form transformation processing may be easily and conveniently performed on a character image to be processed according to the image block form transformation information outputted by the neural network, so that the character orientation in the character image to be processed subjected to the form transformation processing is the predetermined orientation (for example, a horizontal orientation). Hence, the present disclosure is able to effectively avoid the phenomenon that the accuracy of character recognition for a character image is affected due to inclination of a character orientation.

The technical solutions of character image processing in the present disclosure may improve the accuracy of character recognition. Characters recognized from images to be processed may be used in applications such as information retrieval, image classification, and assisted reading. The specific application scenarios are not limited in the present disclosure.

Figure 4:
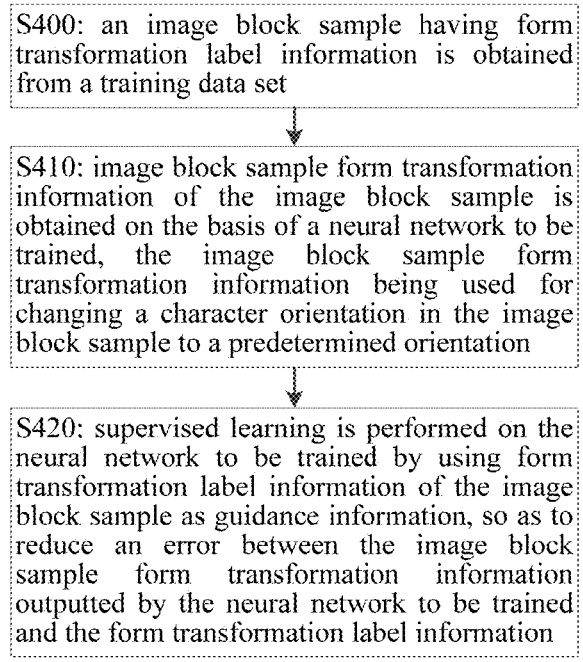
FIG. 4 is a flowchart of a neural network training method provided by embodiments of the present disclosure.

FIG. 4 is a flowchart of a neural network training method in the embodiments of the present disclosure. As shown in FIG. 4, the method includes: operation S400, operation S410, and operation S420. Each operation in FIG. 4 is illuminated in detail as follows.

S400. an image block sample having form transformation label information is obtained from a training data set.

In some implementation modes, the training data set includes a plurality of pieces of training data used for training a neural network, where optionally, the training data includes: an image block sample, form transformation label information of the image block sample, and the like. In the embodiments of the present disclosure, one or more pieces of training data are read from the training data set according to a random reading mode, or according to a sequential reading mode based on the order of the training data. The generating mode for the training data in the training data set may be, but not limited to, as described in FIG. 5. Descriptions are not made herein in detail.

In some implementation modes, the form transformation label information of the image block sample in the training data includes: perspective transformation label information of the image block sample and/or image block sample rotation label information indicating an integer multiple of 90 degrees, for example, perspective coordinate transformation label information of at least one vertex (for example, four vertices) of the image block sample and image block rotation label information indicating an integer multiple of 90 degrees.

S410. image block sample form transformation information of the image block sample is obtained on the basis of a neural network to be trained.

In some implementation modes, the obtained image block sample is provided for the neural network so as to obtain the image block sample form transformation information according to information outputted by the neural network. The image block sample form transformation information is used for changing a character orientation of the image block sample to a predetermined orientation (for example, a horizontal orientation). Optionally, the neural network includes: a shared neural network, a first branch, and a second branch; or the neural network includes: a shared neural network, a first branch, a second branch, and a third branch; or the neural network includes: a shared neural network and a first branch, or a shared neural network and a second branch.

S420. supervised learning is performed on the neural network to be trained by using form transformation label information of the image block sample as guidance information, so as to reduce an error between the image block sample form transformation information outputted by the neural network to be trained and the form transformation label information.

In some implementation modes, in a case where the form transformation label information of the image block sample in the training data includes perspective transformation label information of the image block sample and image block sample rotation label information indicating an integer multiple of 90 degrees (i.e., the neural network at least includes a shared neural network, a first branch, and a second branch), optionally, supervised learning is first performed on the shared neural network and the first branch of the neural network by using the perspective transformation label information of the image block sample as guidance information;

after training for the first branch is completed, a network parameter (such a weight) of the shared neural network and the first branch is fixed, and supervised learning is performed on the second branch of the neural network by using the image block sample rotation label information indicating an integer multiple of 90 degrees as guidance information; after training for the second branch is completed, the training for the neural network to be trained is completed. The trained neural network can be applied to form transformation processing for the character image to be processed above.

In some other implementation modes, in a case where the form transformation label information of the image block sample in the training data includes perspective transformation label information of the image block sample, image block sample rotation label information indicating an integer multiple of 90 degrees, and label information indicating whether the area occupied by the character in the image block sample satisfies a predetermined requirement (i.e., the neural network at least includes a shared neural network, a first branch, a second branch, and a third branch), optionally, supervised learning is first performed on the shared neural network and the first branch of the neural network by using the perspective transformation label information of the image block sample as guidance information; after training for the first branch is completed, a network parameter (such a weight) of the shared neural network and the first branch is fixed, and supervised learning is performed on the second branch of the neural network by using the image block sample rotation label information indicating an integer multiple of 90 degrees as guidance information; after training for the second branch is completed, supervised learning is performed on the third branch of the neural network by using the label information indicating whether the area occupied by the character in the image block sample satisfies the predetermined requirement as guidance information; and after training for the third branch is completed, the training for the neural network to be trained is completed. The trained neural network can be applied to form transformation processing for the character image to be processed above.

In particular, it should be noted that in the optional example above, the order of the training processes for the second branch and the third branch is not specially limited, that is, the second branch and then the third branch may be trained after the training for the first branch is completed, or the third branch and then the second branch may be trained after the training for the first branch is completed. In addition, in the embodiments of the present disclosure, when the first branch and the second branch are trained, the label information indicating whether the area occupied by the character in the image block sample satisfies the predetermined requirement in the used training data is first label information, where the first label information indicates that the area occupied by the character in the image block sample satisfies the predetermined requirement; and when the third branch is trained, training data including the label information indicating that the area occupied by the character in the image block sample satisfies the predetermined requirement, and training data including the label information indicating that the area occupied by the character in the image block sample does not satisfy the predetermined requirement are used.

Figure 5:
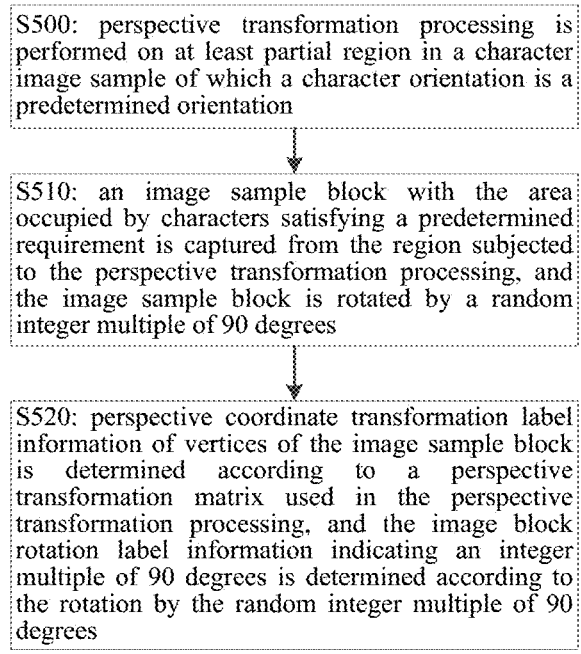
FIG. 5 is a flowchart of training data formation provided by embodiments of the present disclosure.

Optionally, in the embodiments of the present disclosure, the obtaining of the training data for training the shared neural network, the first branch, and the second branch of the neural network includes: performing form transformation processing on at least partial region of a character image sample with a character orientation being a predetermined orientation, and determining form transformation label information according to the form transformation processing, thereby forming the training data by using the form transformation label information, and adding the training data into the training data set. FIG. 5 is a flowchart of formation of training data in a training data set in the embodiments of the present disclosure. As shown in FIG. 5, the method includes: operation S500, operation S510, and operation S520. Each operation in FIG. 5 is illuminated in detail as follows.

S500. perspective transformation processing is performed on at least partial region of a character image sample with a character orientation being a predetermined orientation.

In some implementation modes, the character orientation of the character image sample is a horizontal orientation, for example, the character image sample includes a plurality of character paragraphs substantially having a horizontal orientation. In the embodiments of the present disclosure, optionally, perspective transformation processing can be performed on the entire character image sample according to a randomly generated perspective transformation matrix, or perspective transformation processing may be performed on part of the character image sample according to a randomly generated perspective transformation matrix, for example, a side length of the region subjected to the perspective transformation processing does not exceed one fifth of the long side of the character image sample. In this way, perspective transformation processing is performed on the area to enable the character in the region subjected to perspective transformation processing to be oriented in a non-horizontal direction having an included angle less than predetermined degrees (for example, 30 degrees) with respect to the horizontal direction.

S510. an image sample block with the area occupied by the character satisfying the predetermined requirement (for example, a square image block sample) is captured from the region subjected to perspective transformation processing, and the image sample block is rotated by a random integer multiple of 90 degrees.

In some implementation modes, a ratio of the area occupied by the character in the image sample block captured from the region subjected to perspective transformation processing to the area of the image sample block should reach a predetermined ratio, for example, the ratio should exceed 0.3. In one example, a square image sample block is captured by taking the center of the region subjected to perspective transformation processing as the center, the side length of the square image sample block being shorter than the side length of the area. In the embodiments of the present disclosure, the image sample block is rotated by a random integer multiple of 90 degrees in a certain rotation direction, for example, the image sample block is rotated by a random integer multiple of 90 degrees clockwise/counterclockwise. In addition, optionally, whether the ratio of the area occupied by the character in the captured image sample block to the area of the image sample block reaches the predetermined ratio may be determined according to a binary matrix of the character image sample, and if not, the capture position may be adjusted so as the enable the ratio of the area occupied by the character in the captured image sample block to the area of the image sample block to reach the predetermined ratio. The binary matrix is used for distinguishing a character area and a non-character area in the character image sample.

S520. perspective coordinate transformation label information of vertices of the image sample block is determined according to the perspective transformation matrix used in perspective transformation processing, and the image block sample rotation label information indicating an integer multiple of 90 degrees is determined according to the rotation by the random integer multiple of 90 degrees.

In some implementation modes, perspective coordinate transformation label information of four vertices of the image sample block is determined according to the perspective transformation matrix used in perspective transformation processing, and optionally, the image sample block, the perspective coordinate transformation label information of the four vertices of the image sample block, and the image block sample rotation label information indicating an integer multiple of 90 degrees may be added to the training data set as one piece of training data; or, the ratio of the area occupied by the character in the image sample block to the area of the image sample block may also be taken as a part of the training data.

In some implementation modes, during the process of training the third branch, all the used training data include training data indicating that the area occupied by the character in the image block sample satisfies the predetermined requirement, and training data indicating that the area occupied by the character in the image block sample does not satisfy the predetermined requirement.

Optionally, the neural network trained by using the training method is used for processing an image block in the character image processing method, so as to obtain image block form transformation information of the image block.

Figure 6:
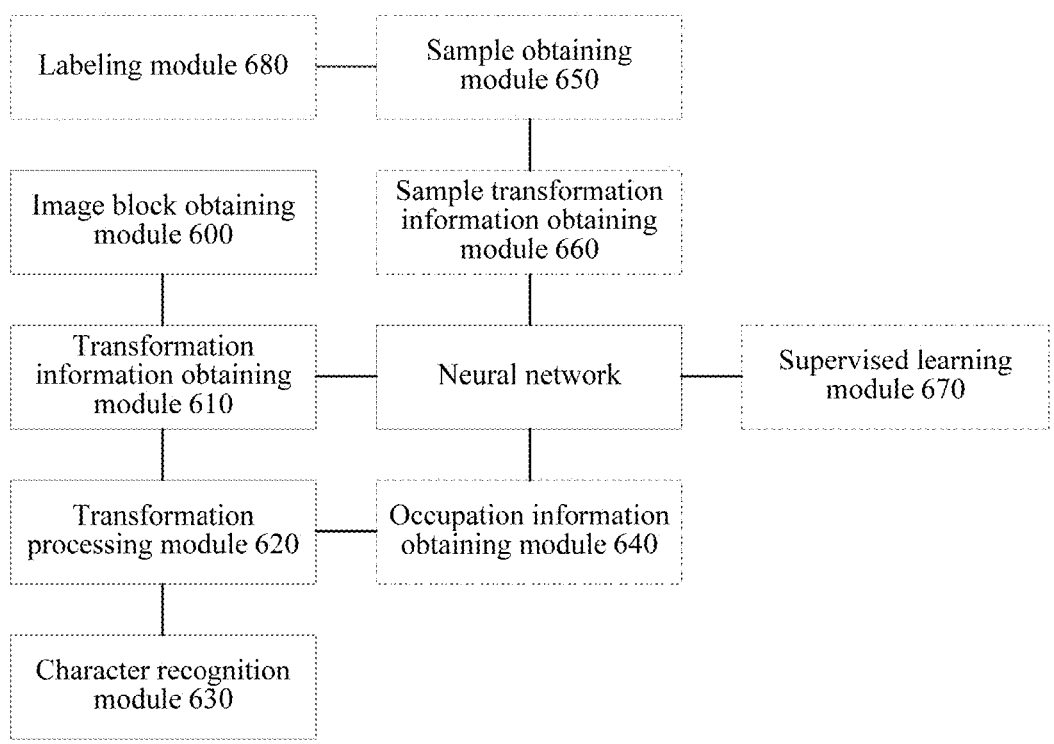
FIG. 6 is a schematic structural diagram of a character image processing apparatus provided by embodiments of the present disclosure.

FIG. 6 is a schematic structural diagram of a character image processing apparatus provided by embodiments of the present disclosure. As shown in FIG. 6, the apparatus includes: an image block obtaining module 600, a transformation information obtaining module 610, a transformation processing module 620, and a character recognition module 630. In some implementation modes, the apparatus further includes: an occupation information obtaining module 640, a sample obtaining module 650, a sample transformation information obtaining module 660, a supervised learning module 670, and a labeling module 680.

The image block obtaining module 600 is configured to obtain at least one image block containing a character in a character image to be processed. Reference is made to related foregoing descriptions for S100 for the specific operations executed by the image block obtaining module 600. Descriptions are not made herein in detail.

The transformation information obtaining module 610 is configured to obtain image block form transformation information of the image block on the basis of a neural network, where the image block form transformation information being used for changing a character orientation in the image block to a predetermined orientation (for example, a horizontal orientation). The neural network in the present disclosure is obtained by the neural network training apparatus by means of training using an image block sample having form transformation label information. Reference is made to related foregoing descriptions for S110 for the specific operations executed by the transformation information obtaining module 610. Descriptions are not made herein in detail.

The transformation processing module 620 is configured to perform form transformation processing on the character image to be processed according to the image block form transformation information. In some implementation modes, in a case where the apparatus in the present disclosure includes the occupation information obtaining module 640, the transformation processing module 620 is configured to perform form transformation processing on the character image to be processed according to the image block form transformation information when indication information indicating whether the area occupied by the character in the image block satisfies a predetermined requirement indicates that the area occupied by the character in the image block satisfies the predetermined requirement, otherwise, the transformation processing module 620 does not execute the operation of performing form transformation processing on the character image to be processed according to the image block form transformation information. Reference is made to related foregoing descriptions for S120 for the specific operations executed by the transformation processing module 620. Descriptions are not made herein in detail.

The character recognition module 630 is configured to perform character recognition on the character image to be processed which is subjected to form transformation. The character recognition module 630 can perform character recognition on the character image to be processed which is subjected to form transformation by using OCR and other technologies.

The occupation information obtaining module 640 is configured to obtain, on the basis of the neural network, the indication information indicating whether the area occupied by the character in the image block satisfies the predetermined requirement. Reference is made to related foregoing descriptions for S120 for the specific operations executed by the occupation information obtaining module 640. Descriptions are not made herein in detail.

The sample obtaining module 650 is configured to obtain an image block sample having form transformation label information. Reference is made to related foregoing descriptions for S400 for the specific operations executed by the sample obtaining module 650. Descriptions are not made herein in detail.

The sample transformation information obtaining module 660 is configured to obtain image block sample form transformation information of the image block sample on the basis of a neural network to be trained, where the image block sample form transformation information being used for changing a character orientation of the image block sample to a predetermined orientation (for example, a horizontal orientation). Reference is made to related foregoing descriptions for S410 for the specific operations executed by the sample transformation information obtaining module 660. Descriptions are not made herein in detail.

The supervised learning module 670 is mainly configured to perform supervised learning on the neural network to be trained by using form transformation label information of the image block sample as guidance information, so as to reduce an error between the image block form transformation information outputted by the neural network to be trained and the form transformation label information. Reference is made to related foregoing descriptions for S420 for the specific operations executed by the supervised learning module 670. Descriptions are not made herein in detail.

The labeling module 680 is configured to perform form transformation processing on at least partial region of a character image sample with a character orientation being a predetermined orientation, and determine form transformation label information according to the form transformation processing. Reference is made to related foregoing descriptions for FIG. 5 for the specific operations executed by the labeling module 680. Descriptions are not made herein in detail.

Figure 7:
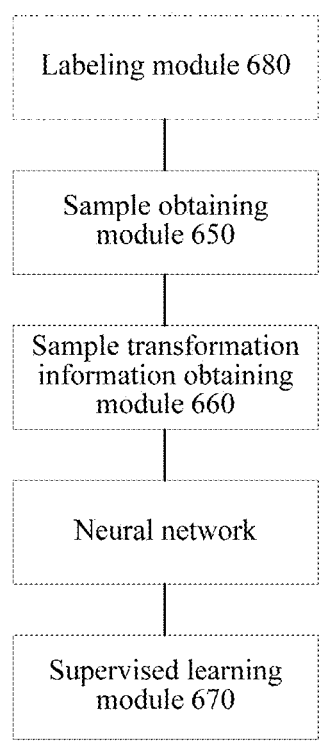
FIG. 7 is a schematic structural diagram of a neural network training apparatus provided by embodiments of the present disclosure.

FIG. 7 is a schematic structural diagram of a neural network training apparatus provided by embodiments of the present disclosure. As shown in FIG. 7, the apparatus mainly includes: a sample obtaining module 650, a sample transformation information obtaining module 660, and a supervised learning module 670. In some implementation modes, the apparatus further includes: a labeling module 680. Reference is made to related foregoing descriptions for the implementation modes of the character image processing apparatuses and methods for the specific operations executed by the modules in this apparatus. Descriptions are not made herein in detail.

Figure 8:
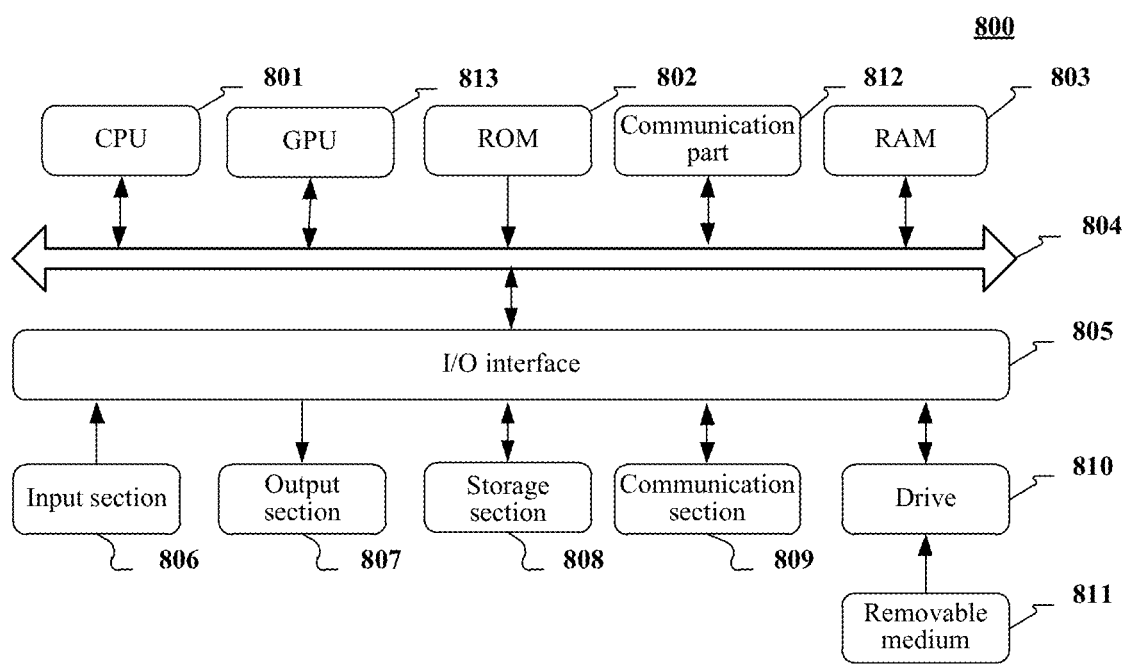
FIG. 8 is a block diagram of an exemplary device according to the present disclosure.

FIG. 8 illustrates an exemplary device 800 suitable for implementing the technical solutions of the present disclosure. The device 800 is a control system/electronic system configured in an automobile, a mobile terminal (such as a smart mobile phone), a PC (such as a desktop computer or a notebook computer), a tablet computer, or a server. In FIG. 8, the device 800 includes one or more processors, a communication part, and the like. The one or more processors are, for example, one or more Central Processing Units (CPUs) 801 and/or one or more Graphic Processing Units (GPUs) 813, and the processors may perform various appropriate actions and processing according to executable instructions stored in a Read-Only Memory (ROM) 802 or executable instructions loaded from a storage section 808 to a Random Access Memory (RAM) 803. The communication part 812 includes, but not limited to, a network interface card. The network interface card includes, but not limited to, an Infiniband (IB) network interface card. The processor may communicate with the ROM 802 and/or the RAM 830, to execute executable instructions. The processor is connected to the communication part 804 via a bus 812, and communicates with other target devices via the communication part 812, thereby implementing corresponding operations in the method implementation modes of the present disclosure.

In addition, the RAM 803 further stores various programs and data required for operations of an apparatus. The CPU 801, the ROM 802, and the RAM 803 are connected to each other by means of the bus 804. In the case that the RAM 803 exists, the ROM 802 is an optional module. The RAM 803 stores executable instructions, or writes the executable instructions into the ROM 802 during running, where the executable instructions cause the CPU 801 to execute operations included in the foregoing object segmentation method. An Input/Output (I/O) interface 805 is also connected to the communication bus 804. The communication part 812 may be configured integrally, and may also be configured to have multiple sub-modules (for example, multiple IB network interface cards) separately connected to the bus.

The following components are connected to the I/O interface 805: an input section 806 including a keyboard, a mouse and the like; an output section 807 including a Cathode-Ray Tube (CRT), a Liquid Crystal Display (LCD), a speaker and the like; the storage section 808 including a hard disk drive and the like; and a communication section 809 of a network interface card including an LAN card, a modem and the like. The communication section 809 performs communication processing via a network such as the Internet. A drive 810 is also connected to the I/O interface 805 according to requirements. A removable medium 811 such as a magnetic disk, an optical disk, a magneto-optical disk, a semiconductor memory is installed on the drive 810 according to requirements, so that a computer program read from the removable medium is installed on the storage section 808 according to requirements.

It should be particularly noted that, the architecture illustrated in FIG. 8 is merely an optional implementation. During specific practice, the number and types of the components in FIG. 8 may be selected, decreased, increased, or replaced according to actual requirements. Different functional components may be configured separately or integrally or the like. For example, the GPU and the CPU may be configured separately. For another example, the GPU may be integrated on the CPU, and the communication part may be configured separately, and may also be configured integrally on the CPU or the GPU or the like. These alternative implementations all fall within the scope of protection of the present disclosure.

Particularly, a process described below with reference to a flowchart according to the embodiments of the present disclosure may be implemented as a computer software program. For example, the embodiments of present disclosure include a computer program product. The computer program product includes a computer program tangibly included in a machine-readable medium. The computer program includes a program code for performing operations shown in the flowchart. The program code may include instructions for correspondingly performing operations provided in the present disclosure.

In such implementations, the computer program is downloaded and installed from the network through the communication section 809, and/or is installed from the removable medium 811. The computer program, when being executed by the CPU 801, executes the foregoing instructions described in the present disclosure.

The methods, apparatuses, electronic devices, and computer-readable storage medium according to the present disclosure may be implemented in many manners. For example, the methods, apparatuses, electronic devices and computer-readable storage medium according to the present disclosure may be implemented by using software, hardware, firmware, or any combination of software, hardware, and firmware. The foregoing sequence of operations of the method is merely for description, and unless otherwise stated particularly, is not intended to limit the operations of the method in the present disclosure. In addition, in some implementations, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. A character image processing method, comprising:
obtaining at least one image block containing a character in a character image;
obtaining, on the basis of a neural network, image block form transformation information of each of the at least one image block, the image block form transformation information being used for changing a character orientation in an image block to a predetermined orientation, wherein the neural network comprises: a shared neural network configured to extract an image feature, a first branch configured to output perspective transformation information of the image block, and a second branch configured to output image block rotation information indicating an integer multiple of 90 degrees, wherein an output end of the shared neural network is respectively connected to input ends of the first branch and the second branch;

obtaining indication information indicating whether an area occupied by the character in the image block satisfies a predetermined requirement;

in a case where the indication information indicates that the area occupied by the character in the image block satisfies the predetermined requirement, performing, according to the image block form transformation information, form transformation processing on the character image; and performing character recognition on the character image which is subjected to the form transformation.

2. The method according to claim 1, wherein the obtaining at least one image block containing a character in a character image comprises:

performing cutting processing on the character image to obtain the at least one image block containing the character in the character image; or performing filling processing on the character image to obtain the at least one image block containing the entire character image.

3. The method according to claim 2, wherein the performing cutting processing on the character image to obtain the at least one image block containing the character in the character image comprises:

cutting, by taking the central position of the character image as the center, and the short side of the character image as the side length, one image block from the character image.

4. The method according to claim 1, wherein the image block form transformation information comprises at least one of:

perspective transformation information of the image block; or image block rotation information indicating an integer multiple of 90 degrees.

5. The method according to claim 4, wherein the performing, according to the image block form transformation information, form transformation processing on the character image comprises:

performing, according to the image block rotation information, rotation processing by the integer multiple of 90 degrees on the character image;

determining, according to the perspective transformation information, a perspective transformation matrix; and performing perspective transformation on a rotated character image by using the perspective transformation matrix.

6. The method according to claim 5, wherein in a case where the at least one image block is a plurality of image blocks, the performing, according to the image block rotation information, rotation processing by the integer multiple of 90 degrees on the character image comprises:

obtaining a probability value of the image block rotation information of each image block in the plurality of image blocks;

selecting, from a plurality pieces of the image block rotation information of the plurality of image blocks, a piece of image block rotation information with a highest probability value; and performing, according to the selected image block rotation information, rotation processing by an integer multiple of 90 degrees indicated by the selected image block rotation information on the plurality of image blocks.

7. The method according to claim 5, wherein in a case where the at least one image block is a plurality of image blocks, the determining, according to the perspective transformation information, a perspective transformation matrix and performing perspective transformation on a rotated character image by using the perspective transformation matrix comprises:

determining, according to the perspective transformation information of each image block in the plurality of image blocks, a perspective transformation matrix of the each image block;

determining, according to the perspective transformation matrix of the each image block, a perspective transformation average matrix; and performing, by using the perspective transformation average matrix, the perspective transformation on the plurality of rotated image blocks.

8. The method according to claim 1, wherein in a case where the indication information indicates that the area occupied by the character in the image block does not satisfy the predetermined requirement, the operation of performing, according to the image block form transformation information, form transformation processing on the character image is not executed.

9. The method according to claim 1, wherein the obtaining indication information indicating whether an area occupied by the character in the image block satisfies a predetermined requirement comprises:

obtaining, on the basis of the neural network, the indication information indicating whether the area occupied by the character in the image block satisfies the predetermined requirement.

10. The method according to claim 8, wherein the obtaining indication information indicating whether an area occupied by the character in the image block satisfies a predetermined requirement comprises:

in a case where the at least one image block is a plurality of image blocks, determining whether the area occupied by the character in each of the plurality of image blocks satisfies a preset requirement;

determining a proportion of image blocks with areas occupied by the character satisfying the preset requirement in the plurality of image blocks; and if the proportion is greater than a preset proportion, generating indication information indicating that the area occupied by the character in the image block satisfies the predetermined requirement.

11. The method according to claim 10, wherein the method further comprises:

if the proportion is not greater than the preset proportion, generating indication information indicating that the area occupied by the character in the image block does not satisfy the predetermined requirement.

12. The method according to claim 1, wherein a neural network training process comprises:

obtaining, from a training data set, an image block sample having form transformation label information;

obtaining, on the basis of a neural network to be trained, image block sample form transformation information of the image block sample, the image block sample form transformation information being used for changing a character orientation in the image block sample to a predetermined orientation; and performing supervised learning on the neural network to be trained by using form transformation label information of the image block sample as guidance information, so as to reduce an error between the image block sample form transformation information outputted by the neural network to be trained and the form transformation label information.

13. The method according to claim 12, wherein the performing supervised learning on the neural network to be trained by using form transformation label information of the image block sample as guidance information, so as to reduce an error between the image block sample form transformation information outputted by the neural network to be trained and the form transformation label information comprises:

performing supervised learning on the shared neural network configured to extract an image feature and the first branch configured to output perspective transformation information of the image block sample in the neural network by using perspective transformation label information in the form transformation label information of the image block sample as guidance information, so as to reduce an error between the perspective transformation information of the image block sample outputted by the first branch and the perspective transformation label information of the image block sample; and after trainings for the shared neural network and the first branch are completed, in a case where network parameters of the shared neural network and the first branch remain unchanged, performing supervised learning on the second branch configured to output image block sample rotation information indicating the integer multiple of 90 degrees in the neural network by using image block sample rotation label information indicating an integer multiple of 90 degrees in the form transformation label information as guidance information, so as to reduce an error between the image block sample rotation information indicating the integer multiple of 90 degrees outputted by the second branch and the image block sample rotation label information indicating the integer multiple of 90 degrees.

14. The method according to claim 13, wherein the performing supervised learning on the neural network to be trained by using form transformation label information of the image block sample as guidance information, so as to reduce an error between the image block sample form transformation information outputted by the neural network to be trained and the form transformation label information further comprises:

after trainings for the shared neural network and the first branch are completed, in a case where network parameters of the shared neural network and the first branch remain unchanged, performing supervised learning on a third branch configured to output indication information indicating whether the area occupied by the character in the image block satisfies a predetermined requirement by using label information indicating whether the area occupied by the character in the image block satisfies the predetermined requirement in the form transformation label information as guidance information, so as to reduce an error between the indication information outputted by the third branch and the label information indicating whether the area occupied by the character in the image block satisfies the predetermined requirement.

15. The method according to claim 1, wherein the obtaining an image block sample having form transformation label information comprises:

performing form transformation processing on at least partial region of a character image sample with a character orientation being a predetermined orientation; and determining the form transformation label information according to the form transformation processing.

16. The method according to claim 15, wherein the performing form transformation processing on at least partial region of a character image sample with a character orientation being a predetermined orientation, and determining the form transformation label information according to the form transformation processing comprises:

performing perspective transformation processing on the at least partial region of the character image sample with the character orientation being the predetermined orientation;

capturing, from the region subjected to perspective transformation processing, an image sample block with an area occupied by the character satisfying a predetermined requirement;

rotating the image sample block by a random integer multiple of 90 degrees;

determining, according to a perspective transformation matrix used in the perspective transformation processing, perspective transformation label information of the image sample block; and determining, according to the rotation by the random integer multiple of 90 degrees, an image block sample rotation label information indicating an integer multiple of 90 degrees.

17. An electronic device, comprising:

a memory, configured to store a computer program; and a processor, configured to execute the computer program stored in the memory, wherein when the computer program is executed, following operations are implemented:

obtaining at least one image block containing a character in a character image;

obtaining, on the basis of a neural network, image block form transformation information of each of the at least one image block, the image block form transformation information being used for changing a character orientation in an image block to a predetermined orientation, wherein the neural network comprises: a shared neural network configured to extract an image feature, a first branch configured to output perspective transformation information of the image block, and a second branch configured to output image block rotation information indicating an integer multiple of 90 degrees, wherein an output end of the shared neural network is respectively connected to input ends of the first branch and the second branch;

obtaining indication information indicating whether an area occupied by the character in the image block satisfies a predetermined requirement;

in a case where the indication information indicates that the area occupied by the character in the image block satisfies the predetermined requirement, performing, according to the image block form transformation information, form transformation processing on the character image; and performing character recognition on the character image which is subjected to the form transformation.

18. A non-transitory computer-readable storage medium having a computer program stored thereon, wherein when the computer program is executed by a processor, following operations are implemented:
   obtaining at least one image block containing a character in a character image;
   obtaining, based on a neural network, image block form transformation information of each of the at least one image block, the image block form transformation information being used for changing a character orientation in an image block to a predetermined orientation, wherein the neural network comprises: a shared neural network configured to extract an image feature, a first branch configured to output perspective transformation information of the image block, and a second branch configured to output image block rotation information indicating an integer multiple of 90 degrees, wherein an output end of the shared neural network is respectively connected to input ends of the first branch and the second branch;
   obtaining indication information indicating whether an area occupied by the character in the image block satisfies a predetermined requirement;
   in a case where the indication information indicates that the area occupied by the character in the image block satisfies the predetermined requirement, performing, according to the image block form transformation information, form transformation processing on the character image; and
   performing character recognition on the character image which is subjected to the form transformation.

* * * * *